(12) United States Patent
Nomoto et al.

(10) Patent No.: US 12,412,224 B2
(45) Date of Patent: Sep. 9, 2025

(54) METHOD, SYSTEM AND COMPUTER-READABLE MEDIUM FOR MANAGING SOUVENIR SUPPLY SERVICE

(71) Applicant: TOYOTA JIDOSHA KABUSHIKI KAISHA, Toyota (JP)

(72) Inventors: Miki Nomoto, Nagoya (JP); Yuka Nishiyama, Toyota (JP); Kenichi Okumura, Gotemba (JP); Ryota Tomizawa, Mishima (JP); Tatsuya Sugano, Shizuoka-ken (JP); Yushi Seki, Kanagawa-ken (JP); Tokuhiro Masui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 18/201,264

(22) Filed: May 24, 2023

(65) Prior Publication Data

US 2023/0419427 A1 Dec. 28, 2023

(30) Foreign Application Priority Data

Jun. 28, 2022 (JP) .................. 2022-103666

(51) Int. Cl.
*G06Q 50/14* (2012.01)
*G06Q 10/0631* (2023.01)
*G06Q 10/0833* (2023.01)

(52) U.S. Cl.
CPC ....... *G06Q 50/14* (2013.01); *G06Q 10/06313* (2013.01); *G06Q 10/0833* (2013.01)

(58) Field of Classification Search
CPC ........ G06Q 10/06; G06Q 10/08; G06Q 50/14; G06Q 10/06313; G06Q 10/0833
See application file for complete search history.

(56) References Cited

U.S. PATENT DOCUMENTS 11,023,957 B1 * 6/2021 Montague ............. H04W 4/023
2009/0106124 A1 * 4/2009 Yang .................. G06Q 30/0601
705/26.1

(Continued)

FOREIGN PATENT DOCUMENTS

JP 2008-250634 A 10/2008
JP 2015-069594 A 4/2015

(Continued)

OTHER PUBLICATIONS

Apriva, AveriGo partner on mobile-first micro market vending technology. Mobile Payments Today. News Features [Louisville] Apr. 23, 2019.*

(Continued)

*Primary Examiner* — Timothy Padot
(74) *Attorney, Agent, or Firm* — Dinsmore & Shohl LLP (57) ABSTRACT

A method for managing a souvenir supply service is provided. The method includes the step of acquiring map information and information on a sightseeing plan of a user using the souvenir supply service. The information on the sightseeing plan comprises positional information on a sightseeing spot visited by the user and information on a time zone during which the user visits the sightseeing spot. The method also includes the step of sending a mobile vehicle loaded with a souvenir associated with the sightseeing spot to the sightseeing spot in the time zone during which the user visits the sightseeing spot based on the map information and the sightseeing plan information.

12 Claims, 9 Drawing Sheets

(56) References Cited

U.S. PATENT DOCUMENTS

| | | | |
|---|---|---|---|
| 2013/0027227 A1* | 1/2013 | Nordstrom | G01C 21/3438 |
| | | | 340/990 |
| 2014/0330739 A1* | 11/2014 | Falcone | G06Q 10/08355 |
| | | | 705/338 |
| 2018/0068514 A1 | 3/2018 | Li et al. | |
| 2019/0200166 A1* | 6/2019 | Ikeda | H04W 4/024 |
| 2021/0319381 A1 | 10/2021 | Ebata et al. | |
| 2022/0261757 A1* | 8/2022 | Tazume | G06Q 50/40 |

FOREIGN PATENT DOCUMENTS

| | | |
|---|---|---|
| JP | 2018-022338 A | 2/2018 |
| JP | 2021-168086 A | 10/2021 |

OTHER PUBLICATIONS

Reis & Irvy's Securing Key Market Franchisee Locations for Frozen Yogurt Vending Robots Throughout the United States. Internet Wire Feb. 22, 2017: NA.*

J. Francis et al., "MetaBot: Automated and dynamically schedulable robotic behaviors in retail environments," 2013 IEEE International Symposium on Robotic and Sensors Environments (ROSE), Washington, DC, USA, 2013, pp. 148-153.*

* cited by examiner

METHOD, SYSTEM AND COMPUTER-READABLE MEDIUM FOR MANAGING SOUVENIR SUPPLY SERVICE

CROSS-REFERENCE TO RELATED APPLICATION

The present application claims priority under 35 U.S.C. § 119 to Japanese Patent Application No. 2022-103666, filed on Jun. 28, 2022, the contents of which application are incorporated herein by reference in their entirety.

FIELD

The present disclosure relates to a method, a system, and a computer-readable medium for managing a souvenir supply service.

BACKGROUND ART

JP2008-250634A discloses a souvenir purchase support system. This system in the related art automatically sets selection conditions related to a souvenir, such as a budget amount and a partner to whom the souvenir is to be delivered, based on information on a business trip schedule of a user who is scheduled to make a business trip. Then, information necessary for purchasing the souvenir satisfying the selection conditions is transmitted to a terminal of the user. The information necessary for the purchase includes, in addition to the information on the souvenir, the information on price of the souvenir, the store selling the souvenir, and the like.

According to the system in the related art, it is possible for the user to purchase the souvenir efficiently at a destination of the business trip. However, it is necessary to go to a sales store in order to purchase the souvenir. In addition, depending on the location of the sales store, it may take a long time to carry the souvenir, which may be annoying to the user.

In this regard, if the user purchases souvenir on-line without going to the sales store and mails the souvenir to a destination desired by the user, the user is relieved from such troublesomeness. However, to omit the step of purchasing the souvenir without watching it in person is to give up the pleasure of the purchase. In particular, in the case of a travel, watching and purchasing the actual souvenir is also one of the pleasures of the travel. Therefore, it can be said that there is a potential demand for a technique capable of more efficiently purchasing the souvenir without depriving the user of the pleasure of watching and purchasing the actual souvenir.

An object of the present disclosure is to provide a technique capable of realizing an efficient purchase of a souvenir by a user without depriving the user of the pleasure of watching and purchasing the actual souvenir.

SUMMARY

A first aspect of the present disclosure is a method for managing a souvenir supply service and has the following features.

The method comprising the steps of:
acquiring map information and information on a sightseeing plan of a user using the souvenir supply service, the information on the sightseeing plan including information on a sightseeing spot visited by the user and information on a time zone during which the user visits the sightseeing spot; and
sending a mobile vehicle loaded with a souvenir associated with the sightseeing spot to the sightseeing spot the time zone during which the user visits the sightseeing spot based on the map information and the information on the sightseeing plan.

A second aspect of the present disclosure is a system for managing a souvenir supply service and has the following features.

The system comprises a server for managing the souvenir supply service.

The server is configured to:
execute processing to acquire map information and information on a sightseeing plan of a user using the souvenir supply service, the information on the sightseeing plan including information on a sightseeing spot visited by the user and information on a time zone during which the user visits the sightseeing spot; and
execute processing to send a mobile vehicle loaded with a souvenir associated with the sightseeing spot to the sightseeing spot the time zone during which the user visits the sightseeing spot based on the map information and the information on the sightseeing plan.

A third aspect of the present disclosure is a non-transitory computer-readable medium on which a program for managing a souvenir supply service is recorded and has the following features.

The program causes a computer to execute processing to:
acquire map information and information on a sightseeing plan of a user using the souvenir supply service, the information on the sightseeing plan including information on a sightseeing spot visited by the user and information on a time zone during which the user visits the sightseeing spot; and
send a mobile vehicle loaded with a souvenir associated with the sightseeing spot to the sightseeing spot the time zone during which the user visits the sightseeing spot based on the map information and the information on the sightseeing plan.

According to the present disclosure, the mobile vehicle loaded with the souvenir associated with the sightseeing spot visited by the user is directed the time zone during which the user visits to the sightseeing spot. Therefore, it is possible to realize efficient purchase of the souvenir by the user without depriving the user of the pleasure of watching and purchasing the actual souvenir related to the sightseeing spot.

DESCRIPTION OF EMBODIMENTS

Hereinafter, a method, a system and a non-transitory computer-readable medium for managing a souvenir supply service according to embodiments of the present disclosure will be described with reference to the accompanying drawings. Note that the method according to the embodiment is realized by computer processing executed by a management server described below. The non-transitory computer-readable medium according to the embodiment stores a program to realize the method according to the embodiment. In the drawings, the same or corresponding parts are denoted by the same reference numerals, and the description thereof will be simplified or omitted.

1. First Embodiment

A first embodiment of the present disclosure will be described with reference to FIGS. 1 to 6.

1-1. Outline

Figure 1:
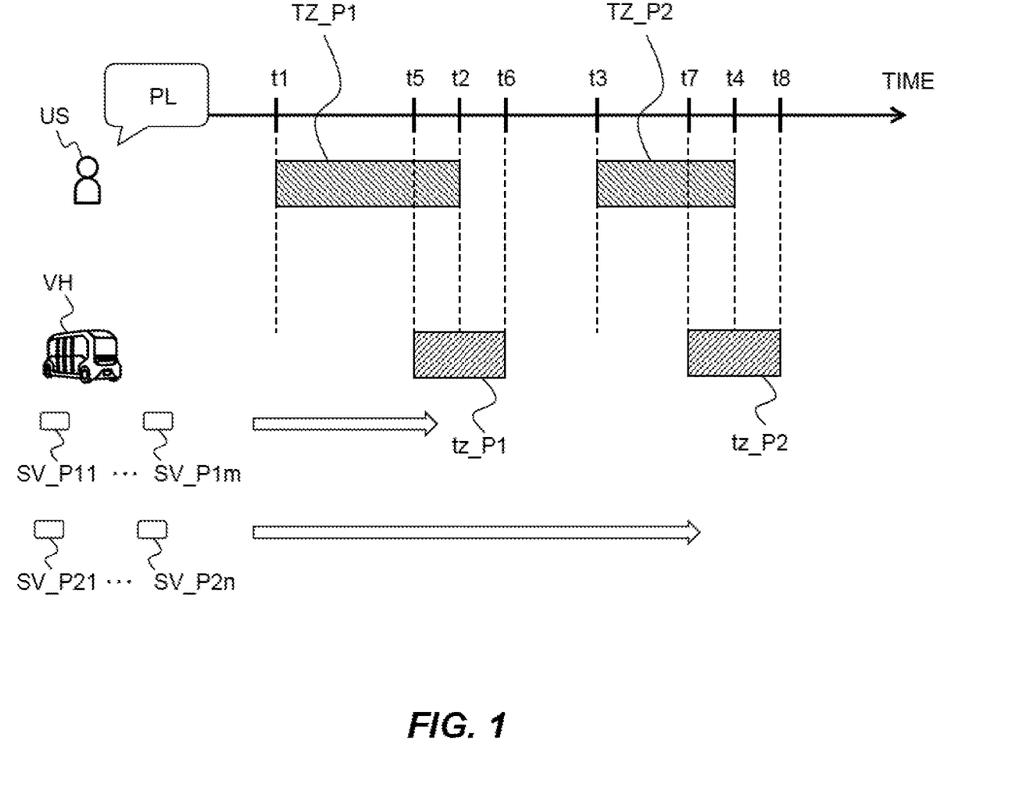
FIG. 1 is a diagram illustrating an outline of a first embodiment.

FIG. 1 is a diagram illustrating the outline of the first embodiment. The souvenir supply service according to the first embodiment is a service for proposing purchase of a souvenir associated with a sightseeing spot to a user. Examples of the sightseeing spot include scenic spots and sightseeing facilities scattered in a sightseeing area. The sightseeing spot includes not only a spot directly related to sightseeing but also a spot indirectly related to sightseeing (e.g., a rest spot such as a restaurant, a hotel, or the like).

In the first embodiment, an example is considered in which a suggestion to purchase a souvenir SV related to a sightseeing spot P1 in the sightseeing area and a user US who visits P2 on the same day. Souvenirs SV_P11, . . . , SV_P1m are examples of the souvenir SV associated with the sighting spot P1, and souvenirs SV_P21, . . . , SV_P2n are examples of the souvenir SV associated with the sighting spot P2 (m, n≥2). These souvenirs are distinguished by tag information specifying the souvenir SV (e.g., a product) such as a kind (an item) of the souvenir, an internal capacity (weight or number) of the souvenir, a size of the souvenir, and a price of the souvenir in addition to information indicating a relationship with the sightseeing spot.

FIG. 1 illustrates information on a sightseeing plan PL of the user US who visits the sightseeing spots P1 and P2 in this order. The information on the sightseeing plan PL includes general information on the sightseeing spot P1 (e.g., information on a name and a position of the sightseeing spot P1) and information on a time zone (a time zone from time t1 to time t2) TZ_P1 during which the user US visits the sightseeing spot P1. The information on the sightseeing plan PL also includes the general information on the sightseeing spot P2 and the information on a time zone (a time zone from time t3 to time t4) TZ_P2 during which the user US visits the sightseeing spot P2.

The information on the sightseeing plan PL is transmitted to the management server in advance from a terminal of the user US (hereinafter also referred to as a "user terminal") or a terminal of a third party (e.g., a travel agent) who has performed the planning of the sightseeing plan PL on behalf of the user US. In the first embodiment, the times zones TZ_P1 and TZ_P2 at which the user US visits the sightseeing spots are specified based on the information on the sightseeing plan PL. Then, based on the time zone TZ_P1 a mobile vehicle VH loaded with souvenirs SV_P11, . . . , SV_P1m is directed to the sightseeing spot P1. Also, based on the time zone TZ_P2, a mobile vehicle VH loaded with souvenirs SV_P21, . . . , SV_P2n is directed to the sightseeing spot P2.

The mobile vehicle VH directed to the sightseeing spot P1 is a different mobile vehicle from that directed to the sightseeing spot P2. This is because the souvenirs SV_P11, . . . , SV_P1m and the souvenirs SV_P21, . . . , SV_P2n are not simultaneously loaded on the same mobile vehicle in principle. However, when the souvenir SV can be changed from the time zone TZ_P1 to the time zone TZ_P2, the mobile vehicle VH directed to the sightseeing spot P1 may be the same as that directed to the sightseeing spot P2.

The mobile vehicle VH is, for example, a mobile vehicle capable of autonomous driving, and includes a controller, a driving device, various sensors, and the like. The controller controls the driving device based on information acquired from the various sensors in order to autonomous driving along a route from a departure point to a destination. Since a configuration for autonomous driving is known, a detailed description thereof will be omitted here. The mobile vehicle VH is also provided with a display room for displaying the souvenir SV and its samples, where an unmanned cash register is provided. The unmanned cash register is, for example, a system (a self-checkout system) for the user US to perform operations such as a settlement and a bagging of the souvenir SV when the user US wants to immediately purchase the souvenir SV and take it out.

The mobile vehicle VH directed to the sightseeing spot P1 stands by in the sightseeing spot P1 for a time zone tz_P1 including the time zone TZ_P1. In the example shown in FIG. 1, the time zone across an end time t2 of the time zone TZ_P1 is set as the time zone tz_P1. Similar to the time zone tz_P1, the mobile vehicle VH directed to the sightseeing spot P2 stands by at the sightseeing spot P2 for a time zone tz_P2 including the time zone TZ_P2.

When the mobile vehicle VH stands by in the sightseeing spot P1 over the time zone tz_P1, an opportunity for the user US to purchase the souvenirs SV_P11, . . . , SV_P1m is generated. When the mobile vehicle VH stands by in the sightseeing spot P2 over the time zone tz_P2, the opportunity for the user US to purchase the souvenirs SV_P21, . . . , SV_P2n is generated. The user US who has found the mobile vehicle VH performs an authentication with the mobile vehicle VH using, for example, a short-range communication. Thereafter, the user US gets into the mobile vehicle VH, confirms the souvenir SV in actual, and purchases the souvenir SV desired by the user US.

In the first embodiment, to help the user to find the mobile vehicle VH easily, it is desirable that sending information on the mobile vehicle VH is transmitted from the management server to the user terminal. Examples of the sending information include information on a place where the mobile vehicle VH waits for the user US and information on the time zone (that is, time zones tz_P1 and tz_P2) during which the mobile vehicle VH waits for the user US. Examples of the waiting place include a place where the mobile vehicle VH intends to wait for the user US (e.g., a parking facility of the sightseeing spot). In some embodiments, the place where the vehicle VH actually waits for the user US is transmitted to the user terminal.

It is desirable that information on the souvenir SV loaded in the mobile vehicle VH is added to the sending information. This is because, if the information on the souvenir SV is added to the sending information, it helps the user to examine the souvenir SV in advance.

Figure 2:
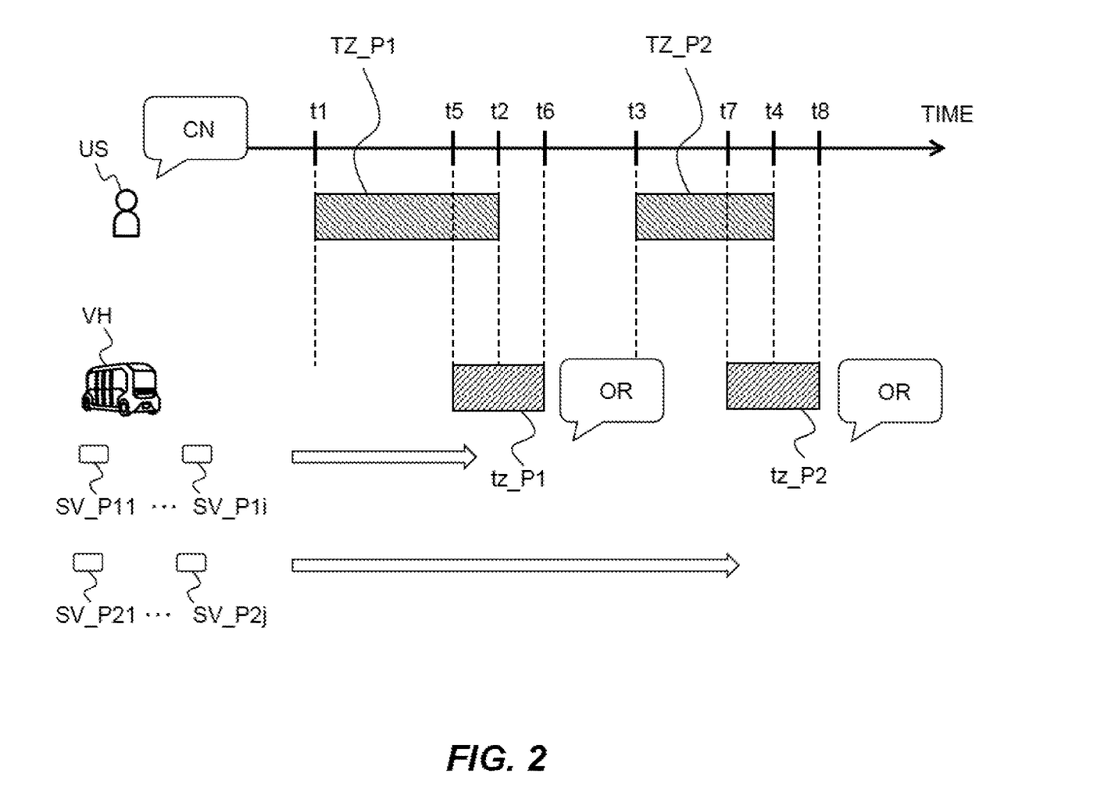
FIG. 2 is a diagram illustrating a direction example of a mobile vehicle when a souvenir is selected based on information on a purchase condition.

In the first embodiment, further, that the souvenir SV to be loaded into the mobile vehicle VH has been selected based on the information on the purchase condition CN of the souvenir SV from the user US. For example, the information on the purchase condition CN is transmitted in advance from the terminal of the user US to the management server separately from the information on the sightseeing plan PL. FIG. 2 is a diagram illustrating a direction example of the mobile vehicle VH when the souvenir SV is selected based on the information on the purchase condition CN.

The purchase condition CN is set in accordance with, for example, a combination of number of persons to whom the souvenirs are to be delivered (i.e., the total number of the souvenirs) and a range of the budget of the souvenirs. When the number of persons to whom the souvenirs are to be delivered is included in the purchase condition CN, the total number of souvenir SVs of the same type to be loaded into the mobile vehicle VH can be determined. Further, when the budget range is included in the purchase condition CN, it can be determined that there is no need to load the souvenir SV outside of the budget range into the mobile vehicle VH. Note that the souvenir SV is loaded into the mobile vehicle VH at a repository (a logistic center) of the souvenir SV.

The purchase condition CN may include information on a preference of the user US or information on an attribute (e.g., family, acquaintance, or colleague) of a person to whom the user US gives souvenir. By adding the preference information or the attribute information to the purchase condition CN, it is expected that the user US likes the souvenir SV loaded in the mobile vehicle VH with a high probability. When the souvenir SV is selected based on the preference information and the attribute information, information on the preference and the attribute may be added to the tag information for specifying the souvenir SV.

In the example shown in FIG. 2, souvenirs SV_P11, ..., SV_P1$i$ associated with the sightseeing spot P1 and souvenirs SV_P21, ..., SV_P2$j$ associated with the sightseeing spot P2 are pre-selected (i≤m, j≤n). Therefore, the souvenir SV which is highly likely to be purchased (to be ordered) by the user US can be loaded into the mobile vehicle VH and proposed to the user US. In addition, by not loading the souvenir SV which is less likely to be purchased by the user US, it is also possible to suppress the cost related to the operation of the souvenir supply service.

1-2. System Configuration Example

Figure 3:
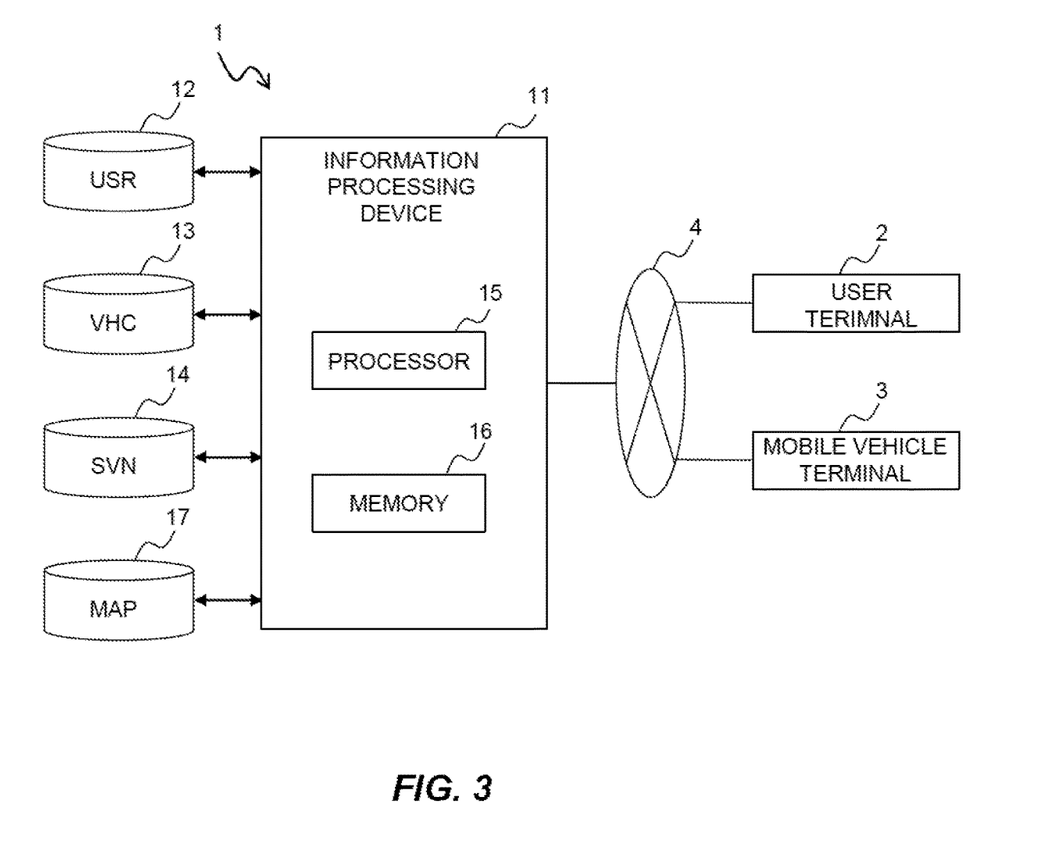
FIG. 3 is a diagram illustrating a configuration example of a system according to the first embodiment.

FIG. 3 is a diagram illustrating a configuration example of a system according to the first embodiment. As shown in FIG. 3, the system according to the first embodiment comprises a management server 1, a user terminal 2 and a mobile terminal 3. The management server 1 communicates with the user terminal 2 and the mobile terminal 3 via a network 4.

The management server 1 manages the souvenir supply service. The management server 1 includes an information processing device 11, a user database (DB) 12, a mobile vehicle DB 13, a souvenir DB 14, and a map DB 17. These databases and the information processing device 11 are connected via a predetermined network.

The information processing device 11 includes at least one processor 15 and at least one memory 16. The processor 15 includes a central processing unit (CPU). The memory 16 is a volatile memory such as a DDR memory, and loads various programs used by the processor 15 and temporarily stores various information. The various information used by the processor 15 includes information stored in a database such as the user DB 12.

Figure 4:
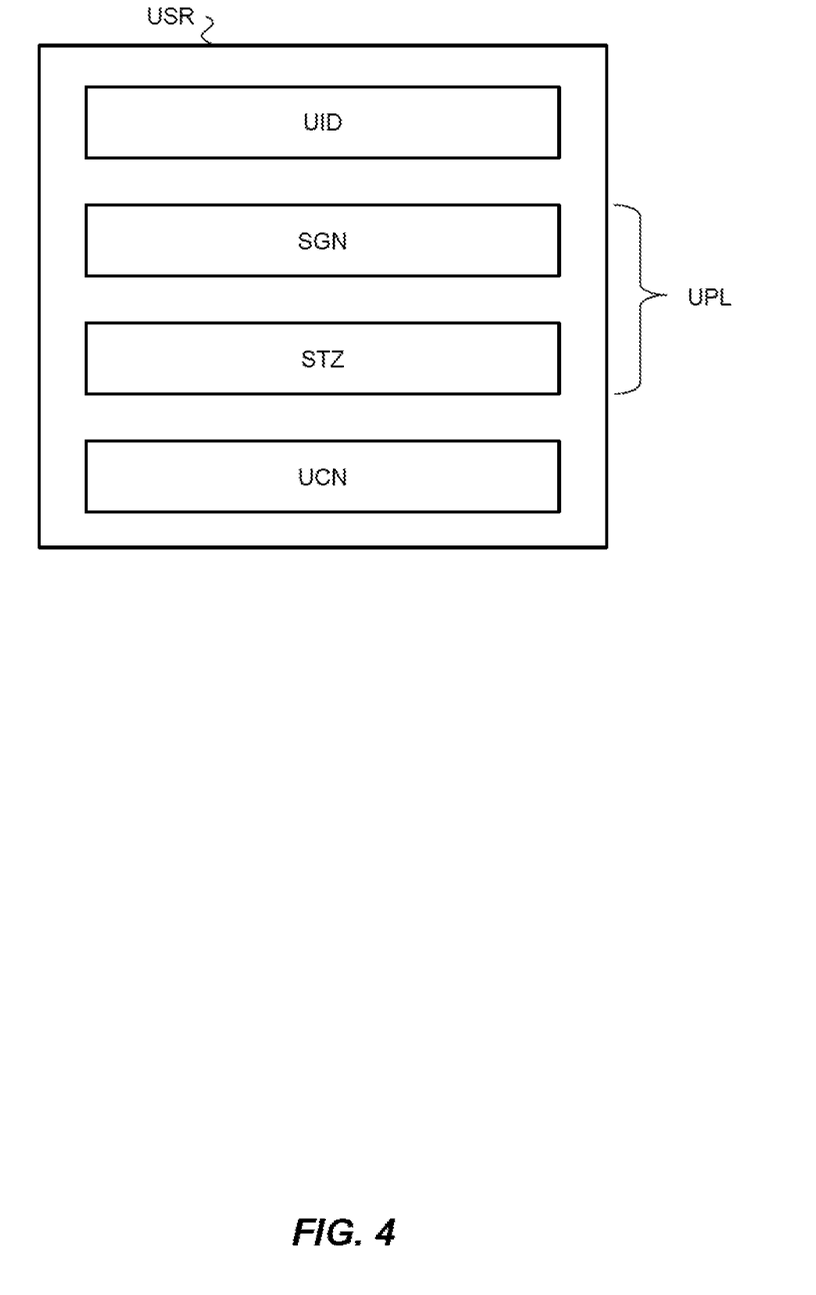
FIG. 4 is a diagram illustrating a configuration example of user information.

Information on the user US of the souvenir supply service (hereinafter also referred to as "user information USR") is stored in the user DB 12. FIG. 4 is a diagram for explaining a configuration example of the user information USR. In the example shown in FIG. 4, the user information USR includes identification information UID, general information SGN, time zone information STZ, and purchase condition information UCN.

The identification information UID is information for identifying the user US. The identification information UID is registered by the user US, for example, at an initial use of the souvenir supply service. Examples of the identification information UID include general information such as name, age, sex, address, and contact information on the user US.

The general information SGN and the time zone information STZ are information included in the information on the sightseeing plan PL of the user US (hereinafter, also referred to as "sightseeing plan information UPL"). The sightseeing plan information UPL also includes information on the date on which the user US visits the sightseeing spot. The general information SGN indicates an outline of the sightseeing spot visited by the user US. Examples of the general information SGN include information on a name and a position of the sightseeing spot where the user US visits. The time zone information STZ indicates a time zone during which the user US visits the sightseeing spot. The time zone information STZ is represented by a time width of several tens of minutes to several hours (e.g., 30 minutes to 2 hours).

The purchase condition information UCN is information indicating the purchase condition CN of the souvenir by the user US. The purchase condition information UCN is registered by the user US when the user information USR is registered, for example. The purchase condition information UCN is appropriately updated by the user US. The purchase condition information UCN is used to select a souvenir SV to be loaded into the mobile vehicle VH. Therefore, when there is no registration of the purchase condition information UCN, the souvenir SV is not selected in accordance with the purchase condition CN.

As described above, the purchase condition CN is set in accordance with, for example, the combination of the number of persons to whom the souvenirs are to be delivered and the budget range of the souvenirs. The preference information on the user US and the attribute information on the user US or the person to whom the souvenirs are to be delivered may be added.

Figure 5:
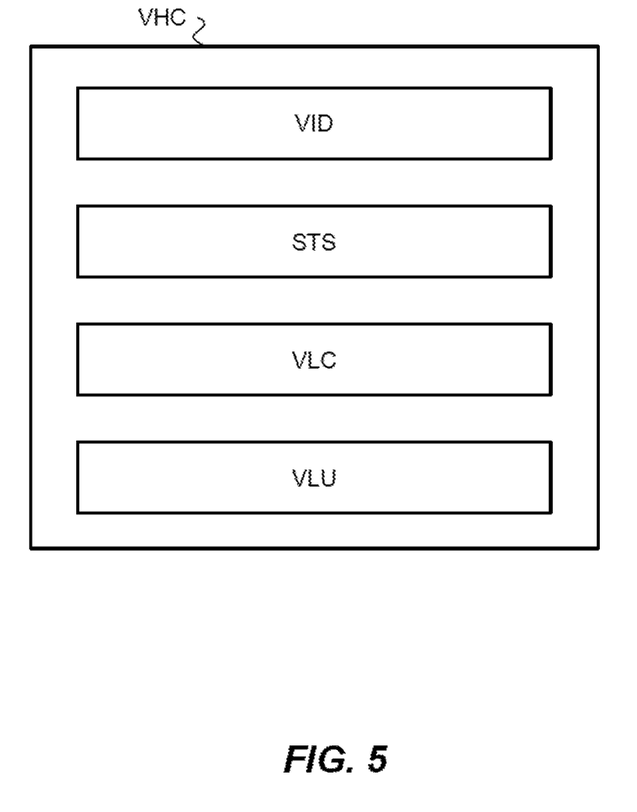
FIG. 5 is a diagram illustrating a configuration example of mobile vehicle information.

Information of the mobile vehicle VH (hereinafter, also referred to as "mobile vehicle information VHC") is stored in the mobile vehicle DB 13. FIG. 5 is a diagram illustrating a configuration example of the mobile vehicle information VHC. In the example shown in FIG. 5, the mobile vehicle information VHC includes identification information VID, status information STS, positional information VLC, and luggage information VLU.

The identification information VID is information for identifying the mobile vehicle VH. Examples of the identification information VID include general information such as a size of the mobile vehicle VH, a volume of an exhibition room, a luggage room, or the like, and a maximum loading capacity.

The status information STS is information indicating the operating status of the mobile vehicle VH. Examples of the status information STS include "active" and "inactive". Detailed status of the active status is also included in the status information STS. Examples of the detailed status of the active status include a status in which souvenirs SV are being loaded (changed) into the vehicle VH, a status in which the vehicle VH is on a way to a sightseeing spot from a repository or a garage, a status in which the vehicle VH is on a way from the sightseeing spot to the repository or the garage from the sightseeing spot, and a status in which the vehicle VH waits for the user US at the sightseeing spot.

The positional information VLC is information indicating an actual position of the mobile vehicle VH. The positional information VLC is generated based on, for example, detection information on various sensors (more specifically, a GPS sensor) included in the mobile vehicle VH.

The luggage information VLU is information on the souvenir SV loaded in the exhibition room, the luggage room, or the like of the mobile vehicle VH. Examples of the luggage information VLU include the tag information for specifying the souvenir SV, such as the type, the internal volume, the size, and the price of the souvenir SV. When the user US purchases the souvenir SV, the luggage information VLU is updated.

Referring back to FIG. 3, the souvenir DB 14 stores information on souvenir SV (hereinafter also referred to as "souvenir information SVN"). Examples of the souvenir information SVN include availability information on various souvenir stored in the repository and sales performance information on the souvenir. The availability information is managed based on the tag information specifying the souvenir SV, such as the type, the internal capacity, the size, and the price of the souvenir SV. The sales performance information is used to calculate sales of the souvenir SV, and is also used to select the souvenir SV to be loaded into the mobile vehicle VH. For example, variations (variations in internal capacity, size, and price) to be loaded into the mobile vehicle VH are increased for the souvenir SV having a high sales performance. The souvenir SV having the high sales performance may be loaded into the mobile vehicle VH even though the souvenir SV has low relationship with the sightseeing spot. On the other hand, the souvenir SV having less sales performance may be lowered in priority for loading into the mobile vehicle VH.

Map information MAP is stored in the map DB 17. Examples of the map information MAP include information on a position of a road, information on a road shape (e.g., types of a curve and a straight line), and information on positions of an intersection and a construction. The construction includes sightseeing spots, parking facilities provided together with respective sightseeing spots, parking facilities around the respective sightseeing spots, and the like.

The user terminal 2 is a communication terminal such as a smartphone or a tablet terminal carried by the user US. An application for using the souvenir supply service is installed in the user terminal 2. Input and transmission of information such as the user information USR, the sightseeing plan information UPL, and the purchase condition information UCN are performed by functions of this application. The order OR of the souvenir SV by the user US is also performed by the function of this application. Authentication with the mobile vehicle VH is also performed by the function of this application.

The mobile terminal 3 is a communication terminal mounted on the mobile vehicle VH. The mobile terminal 3 communicates with the management server 1. In communication with the management server 1, the mobile terminal 3 transmits, for example, detection information on various sensors included in the mobile vehicle VH to the management server 1. The mobile terminal 3 receives various commands from the management server 1. The various commands include a command to move to a destination of the mobile vehicle VH such as the repository of the souvenir SV, the sightseeing spot, or the garage of the mobile vehicle VH. The mobile terminal 3 also communicates with the user terminal 2. Communication with the user terminal 2 is, for example, short-range communication performed when the authentication of the user US is performed.

1-3. Processing Example Executed by Management Server

Figure 6:
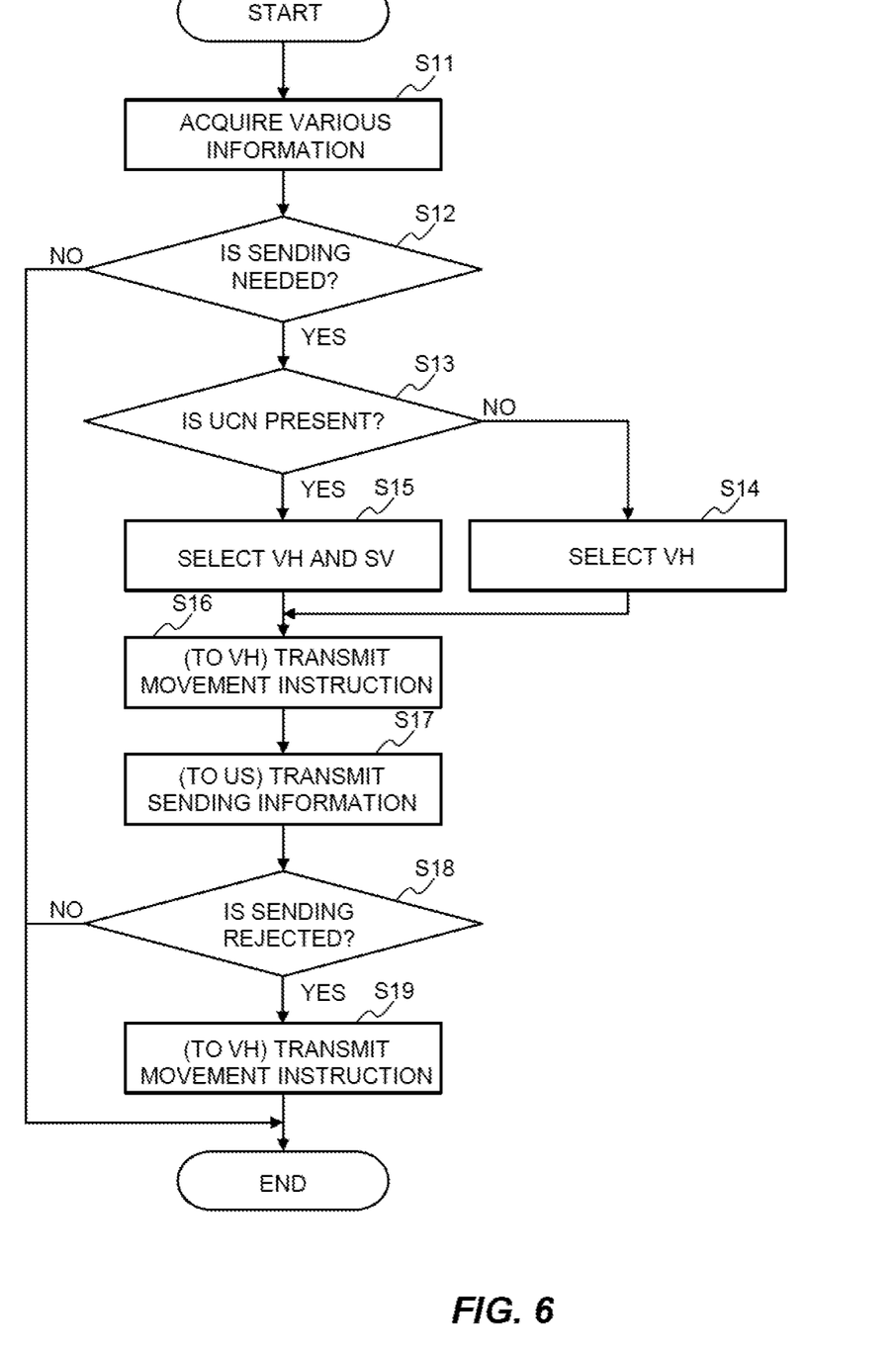
FIG. 6 is a flowchart illustrating a flow of processing executed by a management server particularly related to the first embodiment.

FIG. 6 is a flowchart illustrating a flow of processing executed by the management server 1 (the processor 15) particularly related to the first embodiment. The routine shown in FIG. 6 is repeatedly executed at a predetermined cycle.

In the routine shown in FIG. 6, first, various information is acquired (step S11). As the various information to be acquired, the user information USR in the user DB 12 described above is exemplified.

Following the processing of step S11, it is determined whether a sending (an allocation) of the mobile vehicle VH is necessary (step S12). For example, when the sightseeing plan information UPL included in the user information USR acquired in the processing of step S11 is registered or updated, it is determined whether the information on the visit date or the visit time zone of the sightseeing spot constituting the sightseeing plan information UPL is registered or updated. Then, when it is determined that the information on the visit date or the visit time zone is registered or updated, it is determined that the sending (the allocation) of the mobile vehicle VH is necessary.

When the determination result of step S12 is positive, it is determined whether the purchase condition information UCN is included in the sightseeing plan information UPL (step S13). The sightseeing plan information UPL serving as the determination target in this step is that of the user US for whom it has been determined that sending of the mobile vehicle VH is necessary. When the determination result of step S13 is negative, processing of step S14 is executed. When the determination result of step S13 is positive, processing of step S15 is executed.

In the processing of step S14, the mobile vehicle VH is selected. In the processing of this step, for example, the souvenir SV related to the sightseeing spot is specified based on the general information SGN included in the sightseeing plan information UPL. Then, based on the status information STS, the positional information VLC, and the luggage information VLU included in the mobile vehicle information VHC, the mobile vehicle VH that already carries the souvenir SV related to the sightseeing spot and can be sent to the sightseeing spot is selected. When such a mobile vehicle VH cannot be selected, the mobile vehicle VH that can be sent to the sightseeing spot after the souvenir SV is loaded (changed) is selected based on the information.

In the processing of step S15, the mobile vehicle VH and the souvenir SV are selected. The content of the processing in this step is basically the same as the processing in step S14. However, it is rare that the mobile vehicle VH which already carries the souvenir SV satisfying the purchase condition CN included in the purchase condition information UCN and which can be sent to the sightseeing spot is selected. Therefore, usually, based on the status information STS, the positional information VLC, and the luggage information VLU included in the mobile vehicle information VHC, the mobile vehicle VH that can be sent to the sightseeing spot after the souvenir SV satisfying the purchase condition CN is loaded (changed) is selected.

Following the processing of step S14 or S15, a movement command is transmitted to the mobile vehicle VH selected in this processing (step S16). The movement command includes, for example, information in which a destination of the mobile vehicle VH and a target time zone to reach the destination are combined. Examples of the destination include the repository of the souvenir SV, the sightseeing spot, and the garage of the mobile vehicle VH. According to the movement command, the mobile vehicle VH can reach the sightseeing spot in the target time zone from the current location directly or via the repository. It is also possible for the mobile vehicle VH to return from this sightseeing spot to the garage or the repository.

Following the processing of step S16, sending information is transmitted to the user terminal 2 (step S17). The sending information includes information on the place where the mobile vehicle VH waits and information on the time zone during which the mobile vehicle VH waits for the user US. Information of the souvenir SV loaded in the mobile vehicle VH may be added to the sending information. The sending information may be transmitted immediately after the sending information is generated, or may be transmitted at a preset date and time such as the day before the day when the user US visits the sightseeing spot.

Following the processing of step S17, it is determined whether information on a rejection of the sending (the allocation) is received (step S18). The information on the rejection of the sending is transmitted from the user US who has determined that the sending of the mobile vehicle VH is unnecessary, and this rejection information is performed by the function of the application for using the souvenir supply service. The rejection information is set to be transmitted for each sighting spot. Therefore, the user US can select to reject the sending of the mobile vehicle VH at a certain sightseeing spot (e.g., the sightseeing spot P1) while accepting it at another sightseeing spot (e.g., the sightseeing spot P2).

When the determination result in step S18 is positive, the movement command is transmitted to the mobile vehicle VH selected in step S14 or S15 (step S19). If the sending of the mobile vehicle VH to a part of the sighting spots is rejected, the movement command is modified accordingly and transmitted to the mobile vehicle VH. When the sending of the mobile vehicle VH to all the sightseeing spots is rejected, a command to cancel the movement command is transmitted to the mobile vehicle VH. In this case, the sending of the mobile vehicle VH is stopped.

1-4. Effect

According to the first embodiment described above, the mobile vehicle VH loaded with the souvenir SV related to the sightseeing spot visited by the user US is directed to the time zone during which the user US visits the sightseeing spot. Therefore, it is possible to realize efficient purchase of the souvenir by the user without depriving the user US of the pleasure of watching and purchasing the actual souvenir SV related to the sightseeing spot.

2. Second Embodiment

A second embodiment of the present disclosure will be described with reference to FIGS. 7 to 9. Description overlapping with the description in the first embodiment will be omitted as appropriate.

2-1. Outline

In the first embodiment, in the mobile vehicle VH directed to the sightseeing spot, the user US is able to watch and purchase the actual souvenir SV. When the user US purchases the actual souvenir SV, the user US is able to carry the purchased souvenir SV. However, for the user US who visits a sightseeing spot different from the sightseeing spot where the souvenir SV is purchased after the souvenir SV is purchased, it is expected that carrying the souvenir SV becomes troublesome. When a souvenir SV requiring refrigeration or freezing is purchased, it is expected that it is difficult to carry the souvenir SV.

Therefore, in the second embodiment, when the user US purchases (orders) the souvenir SV, information on a delivery DL of the souvenir SV (hereinafter also referred to as "delivery information UDL") is received. Then, based on the delivery information UDL, the mobile vehicle VH loaded with the souvenir SV (hereinafter also referred to as "ordering item SV_OR") purchased by the user US is directed to a delivery place of the ordering item SV_OR.

Figure 7:
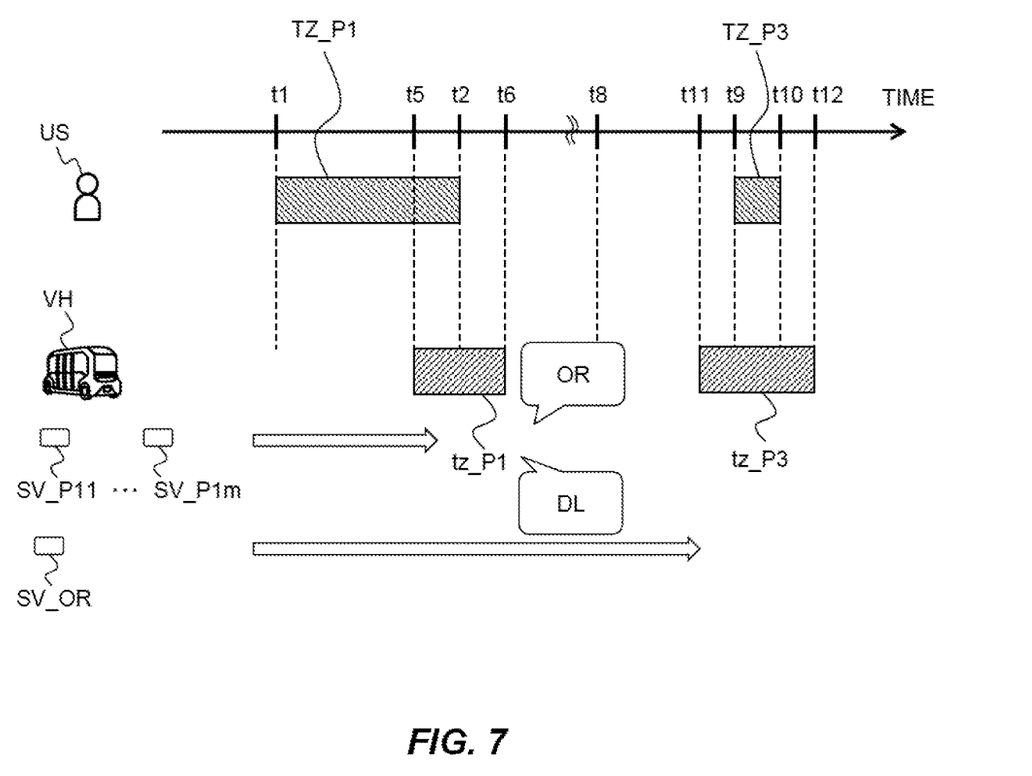
FIG. 7 is a diagram illustrating an outline of a second embodiment.
Figure 8:
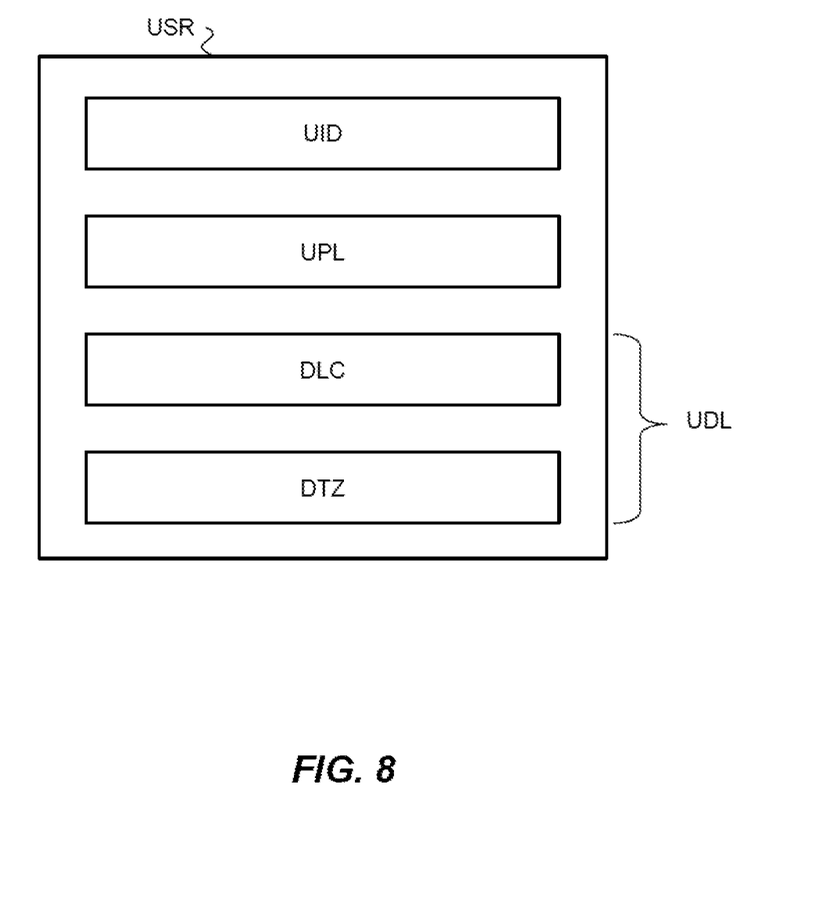
FIG. 8 is a diagram illustrating a configuration example of the user information.

FIG. 7 is a diagram illustrating the outline of the second embodiment. FIG. 7 illustrates a part of the sightseeing plan PL of the user US described in the first embodiment. In the example shown in FIG. 7, the user US purchases (orders) a souvenir SV in the mobile vehicle VH directed to the sightseeing spot P1. At this time, the user US who desires a delivery DL of the ordering item SV_OR rather than the carry of it transmits the delivery information UDL to the management server. Input and transmission of the delivery information UDL are performed by the function of the application for using the souvenir supply service.

The delivery information UDL may be transmitted while the user US gets in the mobile vehicle VH or after the user US gets out of the mobile vehicle VH. However, in the latter case, it is desirable to set a reception valid period of the delivery information UDL. Examples of the reception valid period include a predetermined period (e.g., one week) from the visit date of the sightseeing spot, a period during which the user US stays in the sightseeing area, and the like. The stay period can be predicted from, for example, the visit date of the sightseeing spot constituting the sightseeing plan information UPL.

The delivery information UDL includes information on a delivery place of the ordering item SV_OR and information on a delivery time zone of the ordering item SV_OR. Examples of the delivery place include a base in the sightseeing area of the user US (e.g., a hotel). When the user US visits the sightseeing area by using a transportation means such as a train or an airplane, the examples of the delivery place include a departure and an arrival place of the transportation means. In the case of the souvenir SV requiring refrigeration or freezing, the home of the user US is assumed as the delivery place. The delivery time zone is set by the user US as a time zone during which the user US is able to receive the souvenir SV at the delivery location.

In the example shown in FIG. 7, the location P3 is designated as the delivery location, and a time zone (the time zone from time t9 to t10) TZ_P3 is set as the delivery time zone. The mobile vehicle VH sent to the location P3 stands by at the location P3 over a time zone (the time zone from time t11 to t12) tz_P3 including the handover time zone TZ_P3.

The waiting of the mobile vehicle VH at the location P3 for the time zone tz_P3 creates an opportunity for the user US to receive the ordering item SV_OR. The user US who has found the mobile vehicle VH performs an authentication with the mobile vehicle VH using, for example, the short-range communication. Thereafter, the user US gets into the mobile vehicle VH and receives the ordering item SV_OR.

Similar to the first embodiment, in the second embodiment, the sending information on the mobile vehicle VH is transmitted to the management server and the user terminal. Examples of the sending information include information on the place where the mobile vehicle VH waits for the user US and information on the time zone (i.e., the time zone tz_P3) during which the mobile vehicle VH waits for the user US. In some embodiments, the waiting place is a place where the mobile vehicle VH waits is scheduled (i.e., the place P3), and that a place where the mobile vehicle VH actually waits is transmitted to the user terminal.

2-2. System Configuration Example

The configuration example of the system according to the second embodiment is basically the same as that according to the first embodiment. The difference between the former and the latter lies in the configuration example of the user information USR stored in the user DB. FIG. 8 is a diagram for explaining a configuration example of the user information USR. In the example shown in FIG. 8, the user information USR includes the identification information UID and the sightseeing plan information UPL. Up to this point is as described in FIG. 4. In the example shown in FIG. 8, positional information DLC and time zone information DTZ are further included in the user information USR.

The positional information DLC and the time zone information DTZ are information included in delivery DL information (hereinafter, also referred to as "delivery information UDL"). The positional information DLC is information on a place where the ordering item SV_OR is handed over. The time zone information DTZ is information on a time zone during which the user US visits the place where the ordering item SV_OR is handed over. The time zone information DTZ is represented by a time width of several tens of minutes to several hours (e.g., 30 minutes to 2 hours). Note that the delivery information UDL also includes information on the date on which the ordering item SV_OR is delivered.

2-3. Processing Example Executed by Management Server

Figure 9:
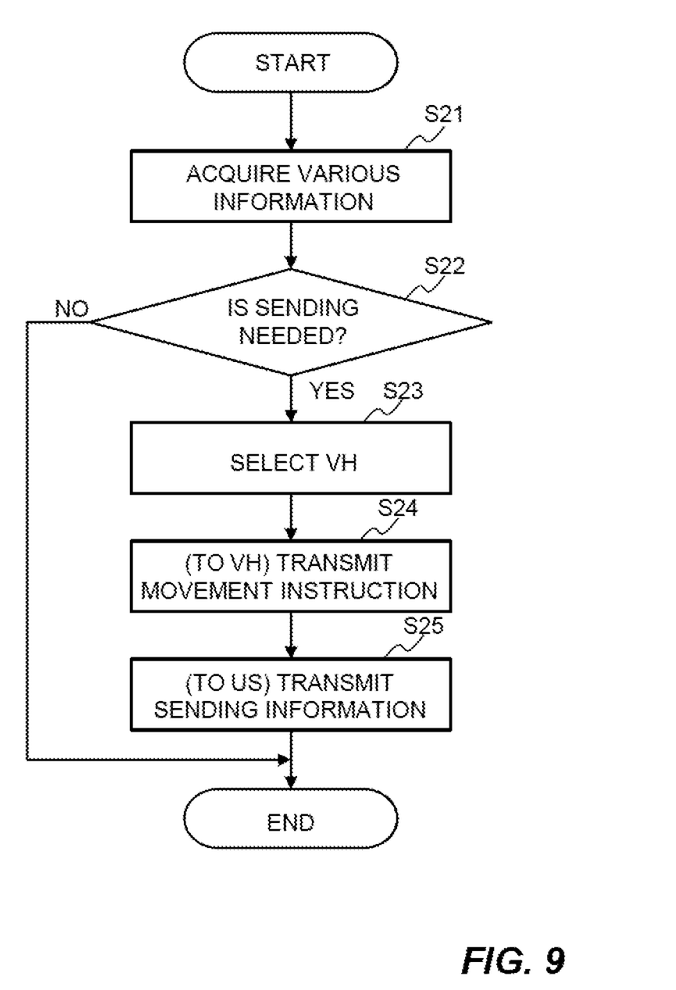
FIG. 9 is a flowchart illustrating a flow of processing executed by a management server particularly related to the second embodiment.

FIG. 9 is a flowchart for explaining the flow of processing by the management server 1 (the processor 15) particularly related to the second embodiment. The routine shown in FIG. 9 is repeatedly executed at a predetermined cycle.

In the routine shown in FIG. 9, first, various information is acquired (step S21). As the various information to be acquired, the user information USR in the user DB 12 described above is exemplified.

Following the processing of step S21, it is determined whether the sending of the mobile vehicle VH is necessary (step S22). For example, when the delivery information UDL included in the user information USR acquired in the processing of step S21 is registered or updated, it is determined whether the information on the delivery date or the delivery time zone constituting the delivery information UDL is registered or updated. Then, when it is determined that the information on the delivery date or the delivery time zone is registered or updated, it is determined that the sending of the mobile vehicle VH is necessary.

If the determination result in step S22 is positive, the mobile vehicle VH is selected (step S23). In the processing of this step, for example, based on the information on the ordering item SV_OR, the delivery information UDL, and the status information STS, the positional information VLC, and the luggage information VLU included in the mobile vehicle information VHC, the mobile vehicle VH that can be sent to the delivery location in the delivery time zone with the ordering item SV_OR loaded thereon is selected.

Following the processing of step S23, the movement command is transmitted to the mobile vehicle VH selected in this processing (step S24). The movement command includes, for example, information on the destination of the mobile vehicle VH and the time zone during which mobile vehicle VH reaches the destination. Examples of the destination include the repository of the souvenir SV, the delivery place, the garage of the mobile vehicle VH, and the like. According to the movement command, the mobile vehicle VH can reach the delivery location in the delivery time zone from the current location directly or via the repository. It is also possible for the mobile vehicle VH to return from this delivery location to the garage or the repository.

Following the processing of step S24, the sending information is transmitted to the user terminal 2 (step S25). The sending information includes information on the place where the mobile vehicle VH waits and information on the time zone during which the mobile vehicle VH waits for the user US. Information of the ordering item SV_OR loaded in the mobile vehicle VH may be added to the sending information. The sending information may be transmitted immediately after the sending information is generated, or may be transmitted at a preset date and time such as the day before the delivery date.

2-4. Effect

According to the second embodiment described above, after the purchase of the souvenir SV, the user US can receive the ordering item SV_OR at the desired location and time zone. Therefore, the user US who has watched and purchased the actual souvenir SV related to the sightseeing spot is released from the trouble of carrying it. This is considered to be advantageous in terms of sales efficiency not only for the user US who visits the sightseeing area (the sightseeing spots) but also for a dealer who sells the souvenir SV to the user US.

What is claimed is:

1. A method for managing a souvenir supply service, the method comprising the steps of:
acquiring map information and information on a sightseeing plan of a user using the souvenir supply service, wherein the information on the sightseeing plan comprises positional information on a sightseeing spot visited by the user and information on a time zone during which the user visits the sightseeing spot, the map information including information on a position of a road, information on a shape of the road including types of a curve and a straight line, and information on position of an intersection and a construction including the sightseeing spot, parking facilities provided together with the sightseeing spot, and parking facilities around the sightseeing spot, the positional information being generated based on detection information from one or more sensors and the positional information comprising a current location of a mobile vehicle;
transmitting one or more commands to control the mobile vehicle to autonomously travel from the current location to the sightseeing spot in the time zone;
controlling the mobile vehicle loaded with a souvenir associated with the sightseeing spot to autonomously travel from the current location to the sightseeing spot in the time zone during which the user visits the sightseeing spot based on the map information and the sightseeing plan information and in accordance with the one or more commands.

2. The method according to claim 1, further comprising the steps of:
acquiring information on a purchase condition on the souvenir of the user; and selecting a souvenir to be loaded into the mobile vehicle based on the information on the purchase condition before sending the mobile vehicle to the sightseeing spot.

3. The method according to claim 1, further comprising the steps of:
acquiring delivery information on an ordering item when an order for a souvenir associated with the sightseeing spot is received from the user, wherein the delivery information includes information on a location where the ordering item is delivered to the user and a time zone during which the ordering item is delivered to the user; and
sending the mobile vehicle loaded with the ordering item to the delivery location of the ordering item in the delivery time zone of the ordering item based on the delivery information.

4. The method according to claim 1, further comprising the step of:
sending information on the mobile vehicle to a terminal of the user, wherein the sending information comprises information on a location where the mobile vehicle waits for the user and a time zone during which the mobile vehicle waits for the user.

5. The method according to claim 4,
wherein the sending information further comprises information on a souvenir loaded in the mobile vehicle.

6. The method according to claim 1, further comprising the step of:
stopping the sending of the mobile vehicle when information on a rejection of the sending of the mobile vehicle is received from a terminal of the user.

7. The method according to claim 1, further comprising performing authentication with the mobile vehicle using a short-range communication, and purchasing the souvenir in response to confirming the authentication with the mobile vehicle.

8. The method according to claim 1, further comprising setting a purchase condition in accordance with a number of the souvenirs to be delivered and a range of budget of the souvenirs.

9. The method according to claim 1, further comprising:
storing information on the souvenir including availability information and sales performance; and
prioritizing the souvenir for loading into the mobile vehicle based on the sales performance information.

10. The method according to claim 1, further comprising selecting the mobile vehicle based on status information, the positional information, and luggage information,
the status information including a status indicative of which souvenir is being loaded into the mobile vehicle, a status indicative of which the mobile vehicle is on a way to the sightseeing spot from a repository or a garage, a status indicative of which the mobile vehicle is on a way from the sightseeing spot to the repository or the garage from the sightseeing spot, and a status indicative of which the mobile vehicle waits for the user at the sightseeing spot, and
the luggage information including tag information for specifying a type of the souvenir, an internal volume of the souvenir, a size of the souvenir, and a price of the souvenir.

11. A system for managing a souvenir supply service, comprising:
a server configured to manage the souvenir supply service, the server comprising a processor and a memory, wherein the processor is configured to:
acquire map information and information on a sightseeing plan of a user using the souvenir supply service, wherein the information on the sightseeing plan includes positional information on a sightseeing spot visited by the user and information on a time zone during which the user visits the sightseeing spot, the map information including information on a position of a road, information on a shape of the road including types of a curve and a straight line, and information on position of an intersection and a construction including the sightseeing spot, parking facilities provided together with the sightseeing spot, and parking facilities around the sightseeing spot, the positional information being generated based on detection information from one or more sensors and the positional information comprising a current location of a mobile vehicle;
transmit one or more commands to control the mobile vehicle to autonomously travel from the current location to the sightseeing spot in the time zone; and
control the mobile vehicle loaded with a souvenir associated with the sightseeing spot to autonomously travel from the current location to the sightseeing spot in the time zone during which the user visits the sightseeing spot based on the map information and the sightseeing plan information and in accordance with the one or more commands.

12. A non-transitory computer-readable medium on which a program for managing a souvenir supply service is recorded, the program causing a computer to execute processing:
acquire map information and information on a sightseeing plan of a user using the souvenir supply service, wherein the information on the sightseeing plan includes positional information on a sightseeing spot visited by the user and information on a time zone during which the user visits the sightseeing spot, the map information including information on a position of a road, information on a shape of the road including types of a curve and a straight line, and information on position of an intersection and a construction including the sightseeing spot, parking facilities provided together with the sightseeing spot, and parking facilities around the sightseeing spot, the positional information being generated based on detection information from one or more sensors and the positional information comprising a current location of a mobile vehicle;
transmit one or more commands to control the mobile vehicle to autonomously travel from the current location to the sightseeing spot in the time zone; and
control the mobile vehicle loaded with a souvenir associated with the sightseeing spot to autonomously travel from the current location to the sightseeing spot in the time zone during which the user visits the sightseeing spot based on the map information and the sightseeing plan information and in accordance with the one or more commands.

* * * * *